Nov. 18, 1952     R. P. TRAINER ET AL     2,618,074
CATALYST STRIPPING AND APPARATUS THEREFOR
Filed Nov. 28, 1950     2 SHEETS—SHEET 1
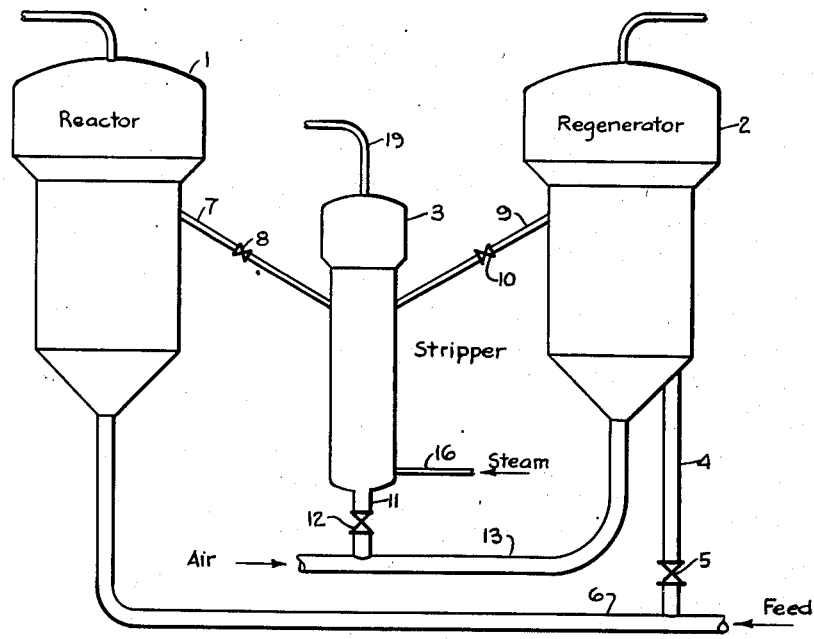
FIG. I
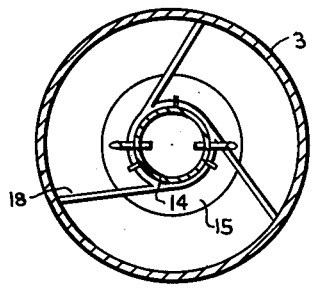
FIG. III
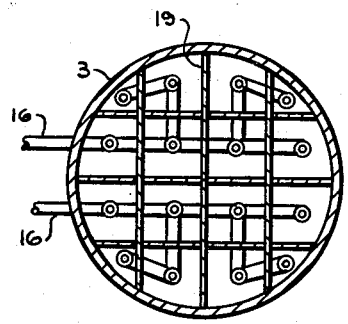
FIG. IV
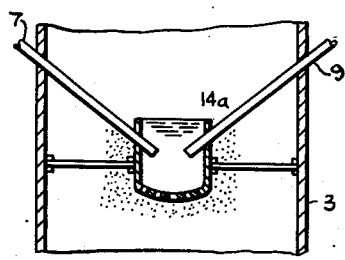
FIG. V
Inventors: Lawson E. Border
Richard P. Trainer
By: *C. J. Ott*
Their Attorney

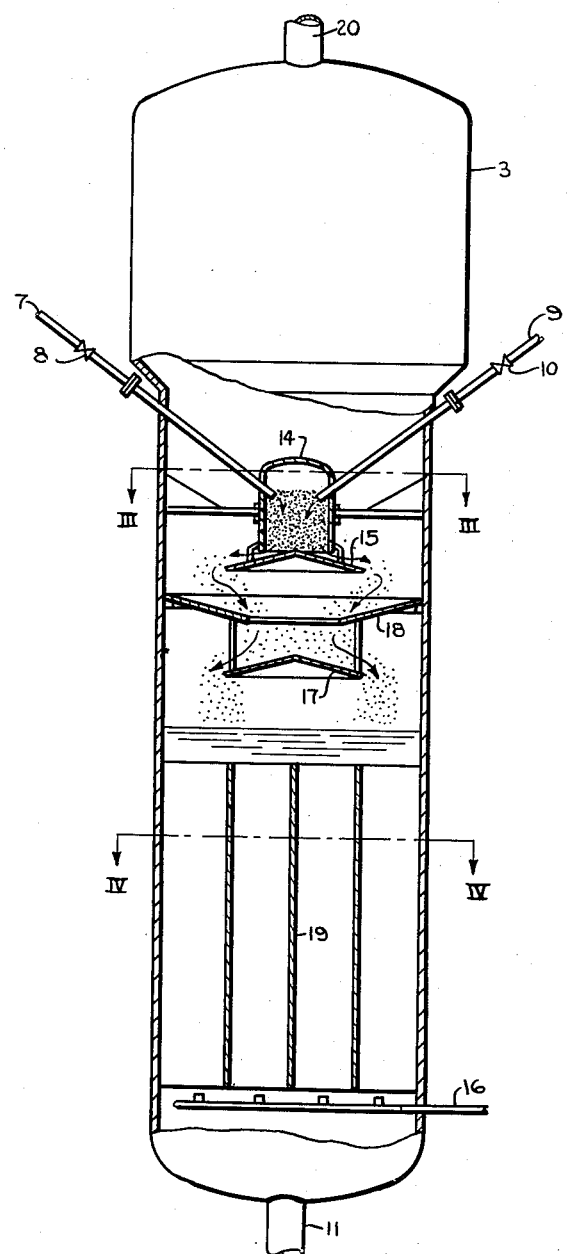
FIG. II
Inventors: Lawson E. Border
Richard P Trainer

Patented Nov. 18, 1952

2,618,074

UNITED STATES PATENT OFFICE 2,618,074

CATALYST STRIPPING AND APPARATUS THEREFOR

Richard P. Trainer, Amityville, N. Y., and Lawson E. Border, Westwood, N. J., assignors to Shell Development Company, Emeryville, Calif., a corporation of Delaware Application November 28, 1950, Serial No. 197,958

3 Claims. (Cl. 34—57)

This invention relates to the stripping of combustible material from powders prior to regeneration by burning and to apparatus therefor.

The object of the invention is to provide an improved method and apparatus in which efficient stripping may be accomplished in a practical manner in a short time.

In the catalytic conversion of hydrocarbons and related materials carried out with a regenerated powdered catalyst utilizing the fluidized catalyst technique, the powdered catalyst leaving the conversion zone contains occluded reactant material and is, furthermore, contaminated with adsorbed products, polymers, tars, and other organic materials of a relatively non-volatile nature. The direct passage of this powder to the regeneration zone would not only cause an appreciable waste of reactant and product but would also greatly increase the difficulty and cost of the subsequent regeneration treatment. Consequently, it is the practice to subject the powdered catalyst leaving the conversion zone to a treatment to remove the more easily removable contaminants before passing the powder to the regeneration zone. This operation, generally referred to as stripping, consists of removing the more easily removable materials by passing a stripping gas, e. g., steam, through the powder. By exhaustive treatment of the spent catalyst with steam, e. g., 900° F., it is possible to remove combustible material up to a certain point which may be considered the ultimate stripping. In practice, however, such exhaustive treatment would be prohibitive as well as detrimental for other reasons and is never applied. The stripping in commercial operation using conventional stripping methods is usually of the order of 40–60% efficient on the above basis.

The importance of the stripping efficiency has been recognized and many attempts have been made to improve the efficiency in a practical manner, i. e., without resorting to excessive amounts of steam and excessively large and costly apparatus. While minor improvements have been obtained by these means in some cases, no substantial improvement has been achieved. This is due in part to the lack of fundamental knowledge of the chemistry, physics and mechanics of stripping of such powders. It is known, however, that the stripping step is effective in at least three ways which are: (1) interstitial vapors are largely removed, (2) some relatively non-volatile adsorbed materials are vaporized and removed and (3) some less volatile materials are decomposed into more volatile products and are removed. On the basis of this knowledge, it would seem that the stripping efficiency could be improved by stripping at a higher temperature. Various methods for increasing the temperature have been suggested such, for example, as to add hot regenerated catalyst to the stripping zone and some improvement has been realized by such methods. The improvement obtained by such methods has, however, been disappointingly small. Thus when stripping a spent cracking catalyst by passing steam up through a bed of the catalyst at a superficial velocity of 0.8 feet/second substantially the same stripping efficiency was obtained when operating at 850° F., 950° F., and 1100° F.

It has now been found why such methods have hitherto failed to give the improvement hoped for, and it has been found how to overcome the difficulty. It has been found that, aside from the mentioned cracking, volatilization, and displacement phenomena, condensation reactions take place which produce non-volatile and non-crackable polycyclic aromatic hydrocarbons in the catalyst. These condensation reactions take place at a fairly rapid rate; this is evidenced by the substantial absence of olefins in the stripped products even though large amounts of olefins are present in the stripping feed. The stripping efficiency can be improved and the advantages of higher temperature stripping can be obtained if these condensation reactions are prevented from taking place to any substantial extent.

In broad general outline the stripping of such catalyst is effected according to the present invention by first rapidly heating the spent catalyst powder to a higher temperature while out of contact with the stripping medium to initiate cracking and effect substantial volatilization of adsorbed materials, followed by a rapid removal of the interstitial vapors, and finally stripping for a longer period of time in a dense phase under conditions to allow the cracking and vaporization to proceed to the fullest extent in the substantial absence of stripped vapors. The operation may be conveniently carried out in a stripper of the design illustrated in the accompanying drawings wherein Figure I is a diagrammatic illustration of a fluidized catalyst catalytic cracking plant provided with the improved stripper design; Figure II is a sectional elevation showing the internal arrangement of one form of the stripper; Figures III and IV are sections through the respective planes of Figure II. Figure V is a sectional elevation of a modified mixing chamber which may be used in place of the chamber 14 of Figure II. The corresponding parts in the figures bear the same reference numbers.

Referring to the drawing, Figure I, a typical fluidized catalyst catalytic cracking plant provided with the improved stripping arrangement comprises a reactor 1, a regenerator 2, and a separate stripper 3. For clearness, the reactor and regenerator are shown spread out and the stripper is shown much enlarged. Regenerated catalyst is withdrawn from the regenerator via standpipe 4 at a rate controlled by a slide valve 5. The hot regenerated catalyst is picked up and transported to the reactor by the feed via line 6. Spent and contaminated catalyst is continuously withdrawn from the reactor via line 7 at a rate controlled by slide valve 8 and passed to the stripper. A stream of hot regenerated catalyst if likewise withdrawn from the regenerator via line 9 at a rate controlled by valve 10 and is passed by gravity to the stripper. The stripped catalyst leaves the stripper via line 11 at a rate controlled by slide valve 12, and is picked up by stream of regeneration gas and transported via line 13 to the regenerator.

Referring to Figure II the spent catalyst enters the stripper 3 near the top via line 7 at substantially the temperature prevailing in the reactor, e. g., 800-1000° F. The hot regenerated catalyst enters the stripper 3 also near the top via line 9. This regenerated catalyst is at a temperature above that of the spent catalyst, e. g., 1000-1300° F. The two streams of catalysts enter a small mixing chamber 14 which in the case illustrated is located within the stripper shell and consists of a dome-shaped vessel open at its lower end. Directly below the mixing chamber and in close proximity thereto is a baffle member 15. The baffle and mixing chamber are so arranged and constructed that catalyst entering the mixing chamber may be somewhat held up but still allowed to discharge through the space between the members. The spent catalyst and hot regenerated catalyst are, therefore, caused to come into intimate contact for a short time sufficient to allow the two streams of catalyst to come to substantially the same temperature. In the case illustrated the mixing is effected without substantial contact with the stripping gas. The hot mixture of catalyst and liberated vapors issuing from the mixing chamber through the described space above the baffle is distributed and caused to fall (shower) for a short distance countercurrent to uprising stripping vapors, e. g. steam, which are introduced near the bottom of the stripper via line 16. Disk and doughnut baffles 17 and 18 are preferably provided to insure good contact of the descending rain of catalyst with the uprising stripping medium. Such baffles may be horizontal or inclined as illustrated. The described disperse phase stripping at this point is important. However, it is totally unnecessary and, in fact, undesirable that this disperse phase stripping consume any appreciable amount of time. Since the contact time of the catalyst in the disperse phase is small this section of the stripper is not large and in no way compares with the large chambers hitherto provided when affecting the stripping entirely in the disperse phase. In this section of the stripper it is merely desired to displace as rapidly as possible the cracked and vaporized material between the catalyst particles and this may be accomplished with a very short contact time. After passing through the short disperse phase zone of the stripper the catalyst is allowed to collect into a substantial fluidized bed where it is further stripped in the so-called dense phase. The contact time of the catalyst in the dense phase existing in the lower half of the stripper is much greater than in the mixing zone and disperse phase zone and is preferably as long as can be economically justified. For this reason it is desirable to maintain the level of the fluidized bed as high as possibly consistent with the described short dispersed phase contact in the zone immediately above the bed. In order to improve the efficiency of the stripping in the dense phase section of the stripper this section is preferably provided with vertical baffles 19 which divide this section into a number of long vertical cells. Stripping gas, e. g., steam, is preferably separately injected by suitable nozzles into each of the cells, as seen in Figure IV. The stripping gas, after passing through the dense catalyst bed and the disperse catalyst phase, is finally discharged via line 20 at the top. This stream may be passed to a conventional apparatus (not shown) to recover the stripped products or it may be passed to the top of the reactor in which case the stripped products are combined with the cracked products from the reactor.

When the stripping is carried out in the manner described the catalyst to be stripped is very quickly raised to a higher temperature by direct and intimate contact with hot regenerated catalyst. The two streams come to temperature equilibrium in a matter of seconds. Also, the temperature is increased to a greater extent by a given amount of the regenerated catalyst than it would if the spent catalyst and hot regenerated catalysts were simultaneously introduced into the fluidized bed. By excluding any substantial amount of the steam from the mixing zone the entire available sensible heat is used to heat the spent catalyst and promote rapid vaporization and cracking of the constituents which tend to condense to polycyclic aromatics which resist cracking and remain in the catalyst. When the hot regenerated catalyst is supplied directly to the fluid bed being stripped the stripping steam absorbs a large amount of the sensible heat thus tending to lower the temperature of the bed; in order to obtain the desired temperature increase it is then necessary to circulate a larger quantity of the hot regenerated catalyst and this, in turn, lowers the contact time of the catalyst in the dense phase. In the described method these shortcomings are avoided.

In the described method the vapors and cracked products are quickly displaced by stripping medium in the short disperse phase contact afforded above the main catalyst bed. These materials are, therefore, quickly removed from the catalyst and prevented from entering into condensation reactions which tend to fix the carbonaceous matter in the catalyst.

In the lower section of the stripping zone, where the catalyst remains for a more extended period of time, the cracking of remaining absorbed material is given time to come to substantial completion. Since the main part of the occluded material is previously removed during the short disperse phase contact the partial pressure of such products in the steam in the dense phase is negligible and this further helps to prevent condensation to non-volatile and non-crackable products.

In the apparatus illustrated and described, the mixing of the contaminated catalyst and the hotter catalyst is effected in the dome-shaped vessel which has a diameter less than that of the stripper shell and is supported in the axis of the shell in the upper half. A sufficient space is allowed within the stripper above the mixing vessel in order to provide a quiescent upper zone (so-called disengaging zone). This apparatus may be modified without departing from the principles described. One advantageous modification is illustrated in Figure 5. Here the mixing chamber, designated 14a, is inverted. The bottom is perforated. The perforations are small and sufficient to pass only a part of the powder introduced into the chamber by lines 7 and 9. In operation the cup-shaped chamber is filled and the powder overflows the upper lip into the dispersed phase section of the stripper. This design has the advantage that it is more flexible, i. e., a greater range of flow rates may be applied. The perforations are necessary in this design to allow the chamber to drain when the operation is stopped. The operation cannot be started if the chamber is full of powder.

*Example*

In the catalytic cracking of gas oil the spent catalyst leaving the reactor contains about 1.95% combustible material and is at a temperature of 955° F. The catalyst is passed to the mixing zone where it is commingled with the regenerated catalyst having a temperature of about 1120° F. The ratio of fresh catalyst to regenerated catalyst continuously introduced into the mixing zone is about 2.3:1. The temperature in the mixing zone is about 1002° F. and the contact time is about three seconds. This hot mixture is allowed to fall from the mixing zone as a spray down through the uprising stripping steam to the fluid bed, the contact time being of the order of five seconds. The hold-up of catalyst in the lower bed allows a contact time of thirty seconds. The amount of steam introduced into the bottom of the stripper is about three pounds per 1000 pounds catalyst. The loading of the stripper is of the order of 520 pounds catalyst per minute per square foot of cross-section.

In this operation, the efficiency is substantially as good using only three pounds of steam as it is when using the larger amounts applied in conventional practice, e. g., six pounds. Also, the total contact time of the catalyst with the steam is less than with conventional operation. This not only saves steam but is important since the contact of the catalyst with steam in the stripping operation is the chief cause of the usual decline in the activity of the catalyst. Under proper conditions the short contact in the mixing zone and in the disperse phase (e. g., in total about eight seconds) has been determined to be equivalent in the stripping operation to about forty seconds stripping in the dense phase. Further contact in the disperse phase effects very little, if any, additional stripping and is undesirable since it utilizes space that can be more advantageously utilized for dense phase stripping. Thus, the approximate thirty seconds contact time afforded in the dense phase to complete the cracking and stripping brings the total contact time up to about e. g., 38 seconds, whereas in order to obtain an equivalent stripping in either the disperse phase or the dense phase a contact time of the order of 150 seconds would be required. This would require a larger stripping vessel for conventional dense phase stripping and a very much larger and more costly vessel for disperse phase stripping.

We claim as our invention:

1. An apparatus for the stripping of finely divided powder contaminated with volatilizable material which comprises in combination a vessel comprising a vertically disposed substantially cylindrical shell having bottom and top closures, a lower conduit for the discharge of stripped powder, an upper conduit for the discharge of stripping vapors, vertical baffles dividing the lower section of said vessel into cells, means near the bottom of said shell for injecting stripping gases into said cells, disk and doughnut baffles in said shell above said vertical baffles, a mixing vessel within said vessel above said disk and doughnut baffles and below said upper conduit, said mixing vessel having separate inlet conduits for two streams of powder, and means for distributing powder from said mixing vessel over said disk and doughnut baffles.

2. An apparatus for the stripping of volatilizable contaminants from powders which comprises in combination a vessel provided with top and bottom closures, an outlet near the top of said vessel for the discharge of gases, an outlet near the bottom of said vessel for the discharge of stripped powder, a dome-shaped mixing chamber open at the bottom supported within the upper half of said vessel, said mixing chamber having a diameter less than the internal diameter of the said vessel and being supported sufficiently below the top of the vessel to provide a settling space, a plate member supported below the said dome-shaped mixing chamber at a distance to create a restricted ring-shaped passage for the effluent from said mixing chamber, separate conduits for the introduction of two streams of powder passing through the wall of said vessel into said mixing chamber and means for introducing a stripping gas near the bottom of said vessel below the said mixing chamber.

3. An apparatus for the stripping of volatilizable contaminants from powders which comprises in combination a substantially cylindrical vessel having top and bottom closures, an outlet near the top of said vessel for the discharge of gases, an outlet near the bottom of said vessel for the discharge of stripped powder, a mixing chamber open at the top and with perforated bottom supported within the upper half of said vessel, said mixing chamber having a diameter less than the internal diameter of said vessel and supported within the upper half of said vessel sufficiently below the top to provide a settling space; disk and doughnut baffles in said shell below said mixing chamber, vertical baffles dividing the lower section of said vessel into cells, means near the bottom of said shell for injecting stripping gas into said cells, and separate conduits for the introduction of two streams of powder passing through the wall of said vessel into said mixing chamber.

RICHARD P. TRAINER.
LAWSON E. BORDER.

REFERENCES CITED

The following references are of record in the file of this patent:

UNITED STATES PATENTS

| Number | Name | Date |
| --- | --- | --- |
| 2,394,814 | Snuggs | Feb. 12, 1946 |
| 2,506,545 | Crowley | May 2, 1950 |
| 2,506,552 | Simpson | May 2, 1950 |
| 2,510,444 | Watson | June 6, 1950 |
| 2,530,645 | Bockman | Nov. 21, 1950 |
| 2,534,778 | Kuhn | Dec. 19, 1950 |
| 2,556,198 | Lassiat | June 12, 1951 |